United States Patent [19]
Lefebvre

[11] Patent Number: 6,085,623
[45] Date of Patent: *Jul. 11, 2000

[54] ORBITAL LATHE

[75] Inventor: Richard Lefebvre, Box 306, Arnold's Cove, Newfoundland, Canada, A0B 1A0

[73] Assignee: Richard Lefebvre, Ontario, Canada

[ * ] Notice: This patent issued on a continued prosecution application filed under 37 CFR 1.53(d), and is subject to the twenty year patent term provisions of 35 U.S.C. 154(a)(2).

[21] Appl. No.: 09/033,246

[22] Filed: Mar. 3, 1998

[51] Int. Cl.⁷ ...................................................... B23B 3/26
[52] U.S. Cl. .............................................. 82/128; 82/130
[58] Field of Search ............................... 82/128, 93, 130, 82/117, 104, 53.1

[56] References Cited

U.S. PATENT DOCUMENTS

| | | | |
|---|---|---|---|
| 3,789,709 | 2/1974 | Kendall et al. ............................... | 82/27 |
| 4,259,885 | 4/1981 | Lindhag ..................................... | 82/128 |
| 4,314,491 | 2/1982 | Hartmann et al. ........................... | 82/4 |
| 4,656,898 | 4/1987 | Hunt et al. .................................. | 82/104 |
| 4,658,681 | 4/1987 | Pollak et al. ............................... | 82/6 R |
| 5,125,299 | 6/1992 | Strait ......................................... | 82/128 |
| 5,383,380 | 1/1995 | Sartori ........................................ | 82/93 |

FOREIGN PATENT DOCUMENTS 1300888  5/1992  Canada .

*Primary Examiner*—Daniel W. Howell
*Assistant Examiner*—Rouzbeh Tabaddor
*Attorney, Agent, or Firm*—Gowling, Strathy & Henderson

[57] ABSTRACT

An orbital lathe for resurfacing a fifth wheel kingpin having a support column insertable between the kingpin and an underlying surface generally axially aligned with the kingpin. A cutting tool is mounted for rotation about a pin axis and has a first positioner for moving the cutting tool radially relative to the pin axis and a second positioner for rotating the cutting tool about an axis generally orthoginal to the pin axis. A driver is provided for rotating the cutting tool about the pin axis to cause the cutting tool to remove material from the kingpin. A transport mechanism acts between the support column and the first and second positioner to move the first and second positioners and in turn the cutting tool along the pin axis.

3 Claims, 2 Drawing Sheets

ORBITAL LATHE

FIELD OF THE INVENTION

This invention relates to portable lathes and in particular to orbital lathes for the in situ machining of fifth wheel kingpins.

BACKGROUND OF THE INVENTION

A trailer in a tractor-trailer combination is connected to the "fifth wheel" of a tractor by a fifth wheel kingpin. Through continued use, the kingpin will wear resulting in a decreased diameter and a consequent diminishment of the security of the connection between the tractor and the trailer.

One method of restoring the diameter of a fifth wheel kingpin is to build it up by depositing new metal on the surface of the kingpin and subsequently machining the build-up kingpin down to its operational size. Although this could be done by first removing the kingpin from the trailer, in order to minimize downtime, it is preferable to build-up and machine the kingpin back down to operational size without removal from the trailer (i.e., "in situ").

It is an object of the present invention to provide a portable orbital lathe for economical in situ machining of a fifth wheel kingpin.

SUMMARY OF THE INVENTION

An orbital lathe for resurfacing a fifth wheel kingpin, said orbital lathe comprising:

a support column insertable between said kingpin and an underlying surface, generally axially aligned with said kingpin;

a cutting tool mounted for rotation about a pin axis and having first positioning means for moving said cutting tool at least and radially relative to said pin axis and second positioning mean, for rotating said cutting tool about an axis generally orthogonal to said pin axis;

drive means for rotating said cutting tool about said pin axis to cause said cutting tool to remove material from said kingpin; and, a transport mechanism acting between said support column and said positioning means for moving said positioning means and in turn said cutting tool along said pin axis.

DESCRIPTION OF DRAWINGS

Preferred embodiments of the present invention are described below with reference to the accompanying drawings in which.

DETAILED DESCRIPTION OF PREFERRED EMBODIMENTS

Figure 1:
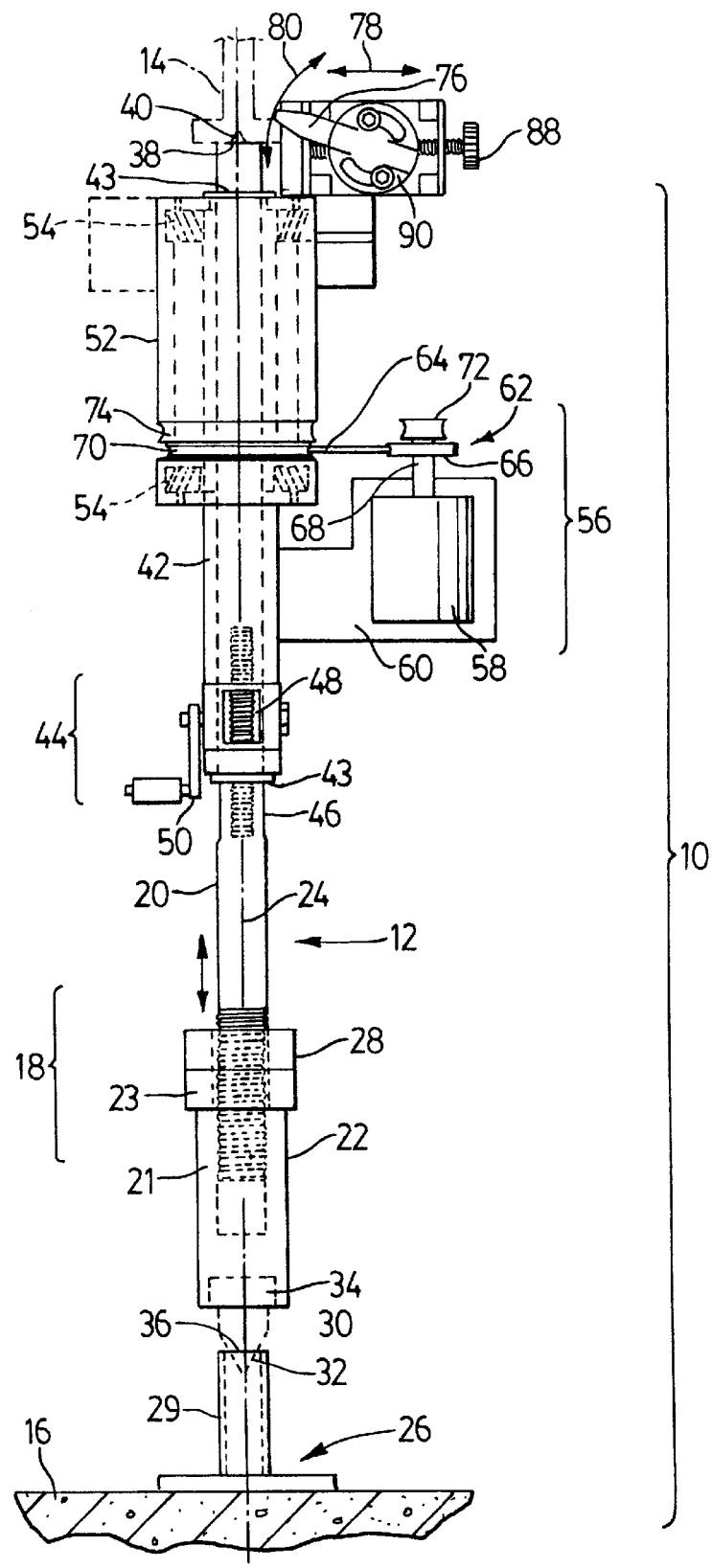
FIG. 1 is a front elevation of a portable lathe according to the present invention.

An orbital lathe according to the present invention is generally identified by reference 10 in FIG. 1. The orbital lathe 10 includes a support column 12 insertable between a fifth wheel kingpin 14 and an underlying surface 16 which may for example be the ground or a concrete footing.

The support column should preferably be of adjustable length to enable secure placement. Any suitable telescoping arrangement may be utilized, one such arrangement is generally illustrated at reference 18. The support column is made up of a first part 20 which is threadedly connected to a second part 22. The second part 22 has a threaded collar 23 welded to its upper end to engage a threaded end 21 of the first part 20. Relative rotation between the first part 20 and the second part 22 will cause relative axial movement between the first part 20 and second part 22 along a pin axis 24 which is aligned with the kingpin 14 when the portable lathe 10 is installed. A locking nut 28 is provided above the threaded collar 23 to prevent relative rotation between the first part 20 and second part 22 once desired length has been attained.

In order to accommodate unevenness in the underlying surface 16, a base member 26 is provided having an upwardly extending tubular part 29 having an inwardly bevelled upper edge 32. A downwardly depending centering plug 34 is mounted to the bottom of the second part 22. The centering plug 34 has a conical projection 36 which registers with the bevelled upper edge 36 of the tubular part 29. This enables the first part 20 and second party 22 to be aligned with the pin axis 24 without having to be exactly perpendicular to the underlying surface 16.

Although a conical projection 36 and bevelled upper edge 32 are shown, other shapes may be selected, for example the centering plug may be dome-shaped and received in a corresponding curved faced upper edge 32.

An upper end 38 of the first part 20 of the support column 12 is provided with a conical projection 40 which registers with a recess in the bottom of the kingpin 14 to act as a centering means to maintain axial alignment between the kingpin 14 and the support column 12 along the pin axis 24.

A cylindrical sleeve 42 extends about the first part 20 of the support column 12 toward the upper end 38 of the first part 20. The sleeve 42 is slidable along the first part 20. A transport mechanism 44 such as a rack 46 secured to the first part and a pinion secured to the sleeve 42 is provided to move the sleeve 42 along the first part 20 of the support column 12. The transport mechanism 44 may also include a crank 50 for rotating the pinion 48. The rack and pinion arrangement also prevents relative rotation between the first part 20 and the sleeve 42. Although a rack and pinion arrangement is shown it is expected that alternate transport means such as cooperating threads or a hydraulic cylinder may be substituted.

In order to provide a close tolerance sliding fit between the first part 20 and the sleeve 42, a guide bushing 43 is threaded into opposite ends of the sleeve 42. The bushing 43 may be made of brass to provide an easily replaced wear component to avoid wear directly between the first part 20 and sleeve 42.

A cylindrical drum 52 extends about the sleeve 42 toward the upper end 38 of the first part 20 of the support column 12. Suitable bearing such as tapered bearings 54 extend between the drum 52 and the sleeve 42 to locate the drum 52 on the sleeve 42 and enable rotation of the drum 52 about the sleeve 42 about the pin axis 24.

Figure 3:
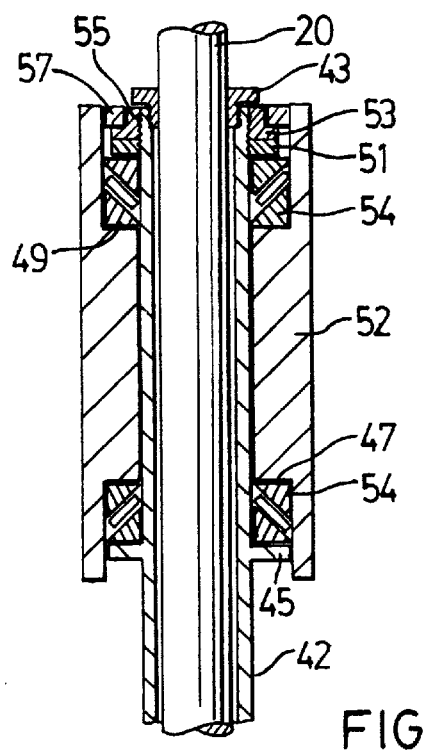
FIG. 3 is a sectional view on line 3—3 of FIG. 2 also showing part of a support column and sleeve according to the present invention.

As shown in more detail in FIG. 3, the lowermost bearing 54 is mounted between a flange 45 extending about the second member 42 and a lower stepped recess 47 in the drum 52. The uppermost bearing 54 is mounted between an upper stepped recess 49 in the drum 52 and a nut 51 threadedly engaging the sleeve 42. The nut 51 provides a means to adjust the crush on the bearings 54. A lock-nut 53 is provided about the nut 51. The lock-nut 53 is provided with an upwardly extending cylindrical lip 55 which accommodates a seal 57 mounted between the sleeve 42 and the drum 52 to prevent cuttings and dirt from entering between the drum 52 and the sleeve 42.

Drive means, generally indicated by reference 56 are provided to cause the drum 52 to rotate about the sleeve 42. The drive means includes a motor 58 secured to a mounting bracket 60 which is rigidly secured to and extends from the sleeve 42. The drive means 56 further includes a rotational coupling, generally indicated by reference 62 comprising a drive belt 64 extending about a drive pulley 66 secured to an output shaft 68 of the motor 58 and a driven pulley 70 extending about or secured to the drum 52. The rotational coupling 62 causes the drum 52 to rotate about the sleeve 42 in response to rotational input from the motor 58. Additional drive and driven pulleys of different diameters such as illustrated by references 72 and 74 respectively may be provided to enable various rotational speeds to be selected for the drum 52.

The above described rotational coupling means is exemplary. Variations such as chain and sprocket or direct gear drive mechanisms may be substituted.

Figure 2:
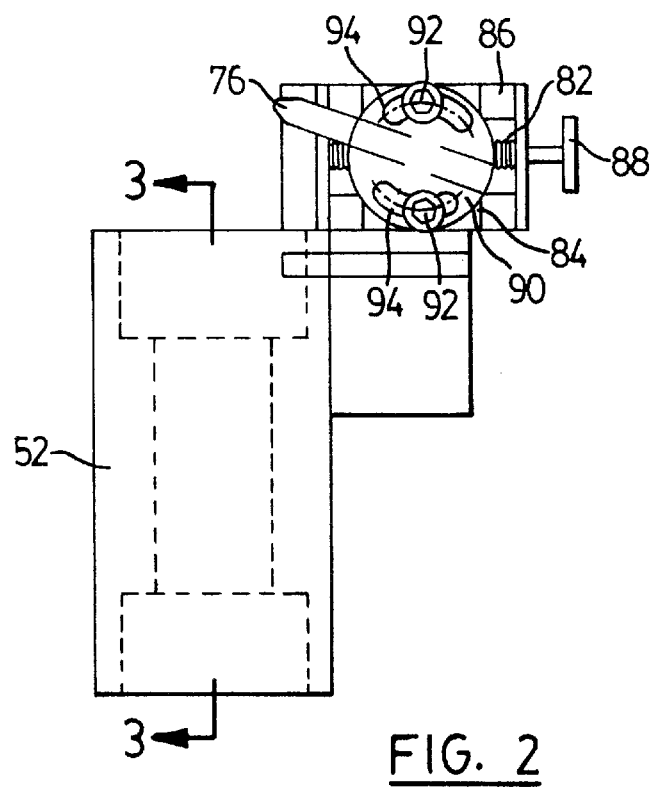
FIG. 2 is a front elevation of a sleeve and a first and a second positioning means according to the present invention.

A cutting tool 76 is secured to the drum 52 and is rotatable with the drum 52 about the pin axis 24. The mounting arrangement for the cutting tool, which is shown in more detail in FIG. 2 includes first positioning means for moving the cutting tool radially relative to the pin axis 24 in the direction of arrows 78. The mounting arrangement for the cutting tool 76 includes second positioning means enabling rotation of the cutting tool 76 about an axis orthogonal to the pin axis 24 in the direction of arrows 80.

The first positioning means may be a threaded rod 82 which extends through a block 84 to which the cutting tool 76 is mounted. Preferably the block 84 is slidably received in a support block 86 for alignment. For example the block 84 and support block may have a matching "dovetail" shaped tongue and groove arrangement such as commonly referred to as a "dovetail block". A knurled knob 88 is provided to rotate the threaded rod 82.

The cutting tool 76 is secured to a tool holder 90 which in turn is secured to the block 84 by hex screws 92. Curved slots 94 are provided in the tool holder 90 which act in conjunction with the hex screws 92 as the second positioning means to allow rotation of the cutting tool 76 in the direction of arrows 80 in FIG. 1. Rotation of the cutting tool above and below a generally horizontal axis is desirable to enable cutting of both an upper and a lower radius on the kingpin 14. Preferably the cutting tool 76 should be rotatable to a generally vertical position should it prove necessary to cut the weld securing the kingpin 14 to the trailer in the event that kingpin replacement rather than resurfacing should prove necessary.

The above description is intended in an illustrative rather than a restrictive sense. Variations to the exact embodiments described may be apparent to those skilled in the relevant art without departing from the spirit and scope of the claims set out below. It is intended that any such variations be deemed within the scope of this patent.

I claim:

1. An orbital lathe for in situ resurfacing a fifth wheel kingpin, said portable lathe comprising:

a support column insertable between said kingpin and an underlying surface, generally axially aligned with a pin axis of said kingpin;

a cutting tool mounted to said support column for rotation about said pin axis and having first positioning means for moving said cutting tool at least radially relative to said pin axis and second positioning means for rotating said cutting tool about an axis generally orthogonal to said pin axis;

drive means for rotating said cutting tool about said pin axis to cause said cutting tool to remove material from said kingpin; and, a transport mechanism acting between said support column and said positioning means for moving said first and second positioning means and in turn said cutting tool along said pin axis.

2. The orbital lathe as claimed in claim 1 wherein:

said support column includes a first part threadedly connected to a second part to provide length adjustability to said support column;

said support column further includes centering means for engaging said kingpin to maintain axial alignment between said support column and said kingpin along said pin axis;

said first and second positioning means are mounted to a drum which encircles a sleeve extending about said first part of said support column and bearings are interspersed between said sleeve and said drum to locate said sleeve relative to said drum and enable said drum to rotate about said sleeve about said pin axis;

said drive means includes a motor mounted to said sleeve and a rotational coupling extending between said motor and said drum to cause said drum to rotate about said sleeve in response to rotational input from said motor; and, said transport means is a rack mounted to one of said sleeve and said first part of said support column which engages a pinion mounted to the other of said first part of said support column and said sleeve.

3. The orbital lathe as claimed in claim 2 wherein said second part is supported by a base member;

said base member includes an upwardly extending generally tubular part having an inwardly bevelled upper edge; and said second part has a downwardly depending centering plug mounted to the bottom thereof, said centering plug having a conical tip for registering with said inwardly bevelled upper edge.

* * * * *